United States Patent [19]

Tanaka et al.

[11] Patent Number: 4,625,994
[45] Date of Patent: Dec. 2, 1986

[54] VEHICLE SUSPENSION APPARATUS

[75] Inventors: Tadao Tanaka, Okazaki; Sunao Chikamori, Nagoya; Mitsuhiko Harara; Shinichi Takeuchi, both of Okazaki; Masanaga Suzumura, Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 694,675

[22] Filed: Jan. 24, 1985

[30] Foreign Application Priority Data

Jan. 24, 1984 [JP] Japan ............................... 59-7215[U]
Jan. 24, 1984 [JP] Japan ............................... 59-7216[U]
Jan. 24, 1984 [JP] Japan ............................... 59-7221[U]
Mar. 22, 1984 [JP] Japan ............................. 59-39920[U]

[51] Int. Cl.$^4$ ..................... B60G 17/00; B60G 17/08
[52] U.S. Cl. .................................. 280/707; 280/702; 280/708; 280/711
[58] Field of Search .............. 280/707, 6 R, 6 H, 700, 280/708, 702, 711, 713; 267/64.28

[56] References Cited

U.S. PATENT DOCUMENTS 4,377,293 3/1983 Senoo ................................. 280/707
4,453,725 6/1984 Kuwana .............................. 280/707

FOREIGN PATENT DOCUMENTS 5733010 4/1980 Japan .

Primary Examiner—Richard A. Bertsch
Attorney, Agent, or Firm—Birch, Stewart, Kolasch & Birch

[57] ABSTRACT

A suspension apparatus has suspension units mounted on wheels and each unit has a fluid spring chamber. Fluid is supplied to contracted fluid spring chambers and is exhausted from elongated fluid spring chambers to control the change in position of the vehicle. In the position control mode, a large-diameter path is selected to supply or exhaust a large amount of compressed fluid. In the height control mode, a small-diameter path is selected to supply or exhaust a small amount of compressed fluid. The required amounts of compressed fluid can be supplied to the fluid spring chambers in both the position and height control modes.

10 Claims, 8 Drawing Figures

F I G. 1
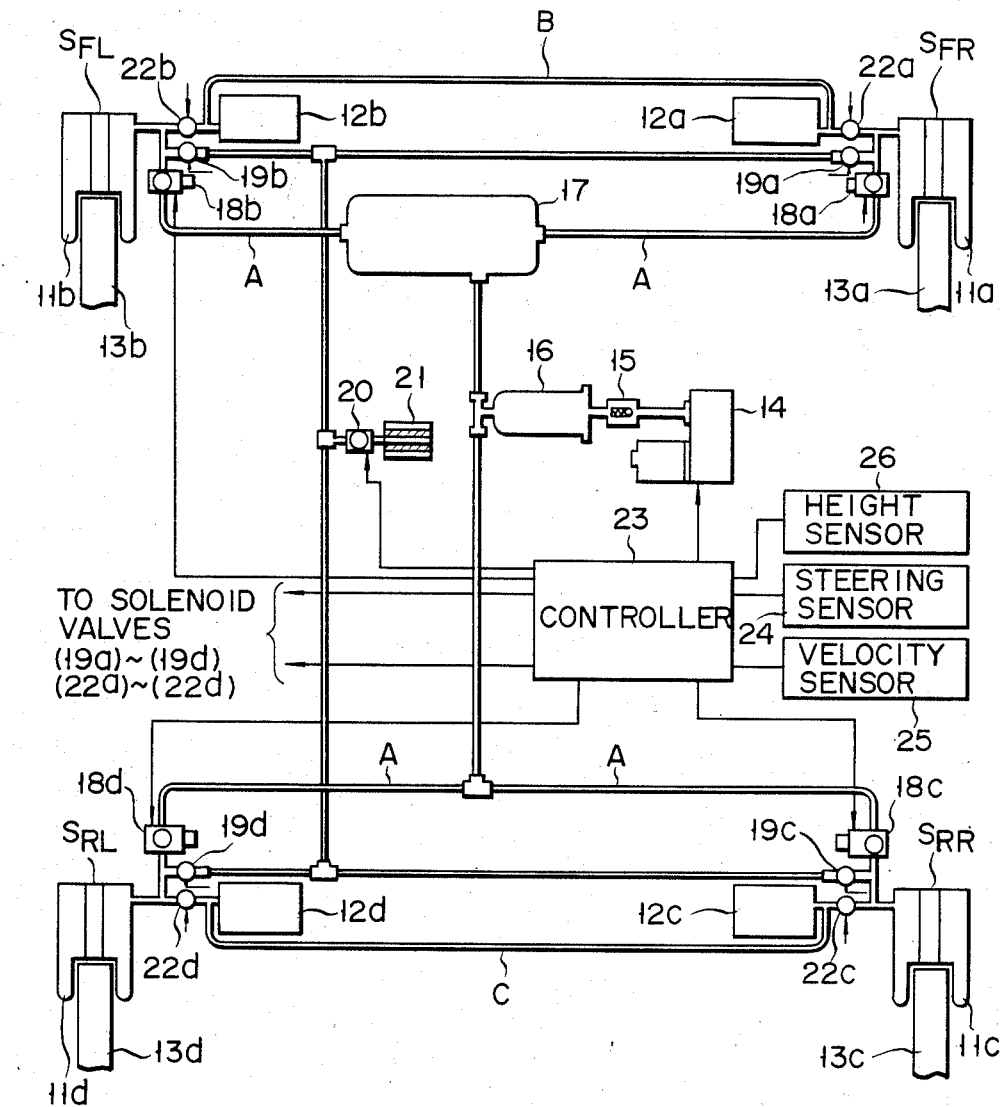

VEHICLE SUSPENSION APPARATUS

BACKGROUND OF THE INVENTION

The present invention relates to a vehicle suspension apparatus for performing the height control and position control of a vehicle.

A conventional suspension apparatus is proposed wherein the damping force of a shock absorber mounted in the suspension unit for each wheel and the spring force of an air spring chamber therein are controlled to improve driving comfort and stability. In this suspension apparatus, a demand has arisen for the provision of a position control function to restrict the rolling of the vehicle body when the vehicle is turned, and a vehicle height control function for maintaining the optimal vehicle height even if the load weight of passengers changes. In a suspension apparatus having a position control function and a height control function, when the amount of compressed air supplied per unit time to the air spring chamber in the position control mode is the same as that in the vehicle height control mode, the vehicle height abruptly increases to cause overshooting, resulting in inconvenience.

SUMMARY OF THE INVENTION

It is an object of the present invention to provide a vehicle suspension apparatus having a position control function and a vehicle height control function, wherein overshooting of the vehicle height in the vehicle height control mode can be reduced.

In order to achieve the above object of the present invention, there is provided a suspension apparatus having suspension units mounted on respective wheel, each unit having a fluid spring chamber; a fluid supply means for supplying a fluid to each fluid spring chamber of the suspension units through respective control valves; and a fluid exhaust means for exhausting the fluid from the fluid spring chambers through the respective exhaust valve, so that the fluid is supplied to the fluid spring chambers of contracted suspension units and the fluid is exhausted from the fluid spring chambers of elongated suspension units when a vehicle changes its position thereof so as to control the change in the position of the vehicle. According to the teachings of the present application,
the fluid supply means comprises a fluid supply path selecting means for selecting one of the large- and small-diameter fluid supply paths and supplying the fluid to the fluid spring chambers through one of the selected large- and small-diameter fluid supply paths, and
the fluid exhaust means comprises a fluid exhaust path selecting means for selecting one of the large- and small-diameter fluid exhaust paths and exhausting the fluid from the fluid spring chambers through one of the selected large- and small-diameter fluid exhaust paths.

BRIEF DESCRIPTION OF THE DRAWINGS

FIG. 1 is a diagram showing a vehicle suspension apparatus according to an embodiment of the present invention.

DETAILED DESCRIPTION OF THE PREFERRED EMBODIMENTS

Figure 2:
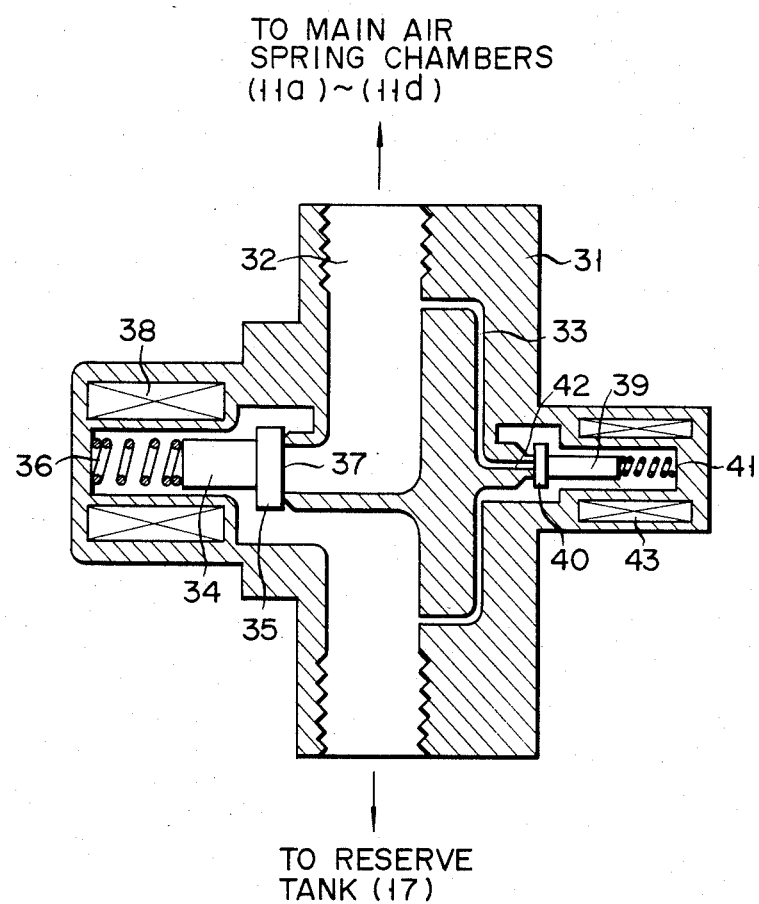
FIG. 2 is a sectional view of an inlet solenoid valve.

A suspension apparatus according to an embodiment of the present invention will be described with reference to the accompanying drawings. Referring to FIG. 1, reference symbol $S_{FR}$ denotes a right front wheel suspension unit; $S_{FL}$, a left front suspension unit; $S_{RR}$, a right rear wheel suspension unit; and $S_{RL}$, a left rear suspension unit. The suspension units $S_{FR}$, $S_{FL}$, $S_{RR}$ and $S_{RL}$ respectively comprise main air spring chambers 11a to 11d, sub air-spring chambers 12a to 12d, shock absorbers 13a to 13d, and coil springs (not shown) serving as auxiliary springs. Reference numeral 14 denotes a compressor. The compressor 14 compresses air supplied from an air cleaner (not shown) and supplies compressed air to a reserve tank 17 through a check valve 15 and a drier 16.

Compressed air stored in the reserve tank 17 is supplied to the main air spring chamber 11a through piping A and an inlet solenoid valve 18a, to the main air spring chamber 11b through the piping A and an inlet solenoid valve 18b, to the main air spring chamber 11c through the piping A and the inlet solenoid valve 18c, and to the main air spring chamber 11d through the piping A and an inlet solenoid valve 18d. The inlet solenoid valves 18a to 18d have the same construction and will be described later in detail with reference to FIG. 2.

The compressed air in the main air spring chambers 11a to 11d is exhausted through exhaust solenoid valves 19a to 19d, an exhaust flow rate control solenoid valve 20 and an exhaust pipe 21. The detailed construction of the exhaust flow rate control solenoid valve 20 will be described in detail later with reference to FIG. 3.

The main air spring chambers 11a and 11b are coupled to each other through a communicating solenoid valve 22a, a communicating pipe B and a communicating solenoid valve 22b. The communicating solenoid valve 22a controls communication between the main spring chamber 11a and the sub air-spring chamber 12a. Similarly, the communicating solenoid valve 22b controls communication between the main air spring chamber 11b and the sub air-spring chamber 12b. The main air spring chambers 11c and 11d are coupled to each other through a communicating solenoid valve 22c, a communicating pipe C and a communicating solenoid valve 22d. The communicating solenoid valve 22c controls communication between the main air spring chamber 11c and the sub air spring chamber 12c. Similarly, the communicating solenoid valve 22d controls communication between the main air spring chamber 11d and the sub air spring chamber 12d.

It should be noted that the inlet solenoid valves 18a to 18d and the exhaust solenoid valves 19a to 19d comprise normally closed valves, and that the communicating solenoid valves 22a to 22d comprise normally open valves.

The solenoid valves 18a to 18d, 19a to 19d, 20 and 22a to 22d are controlled in response to control signals from a controller 23. The controller 23 receives signals from a steering sensor 24 for detecting a steering wheel angle, a velocity sensor 25 for detecting vehicle velocity, and a height sensor 26 for detecting the height at front and rear ends of a vehicle.

The solenoid valves 18a to 18d will be described with reference to FIG. 2. Referring to FIG. 2, reference numeral 31 denotes a valve body. A valve path 32 and a valve path 33 having a smaller diameter than that of the valve path 32 are formed in the valve body 31. One end of the valve path 32 is coupled to the main air spring chambers 11a to 11d. The other end of the valve path 32 is coupled to the reserve tank 17. The valve path 32 serves to supply a large amount of compressed air per unit time for position control. The valve path 32 is closed/opened under the control of a valve seat 35 mounted on a plunger 34. The valve seat 35 is normally seated on a valve hole 37 by a biasing force of a return spring 36 to close the valve hole 37. However, when a solenoid coil 38 is energized, the plunger 34 is moved to the left to separate the valve seat 35 from the valve hole 37. In this manner, the valve hole 37 is opened. The valve path 33 serves to supply a small amount of compressed air per unit time for height control. The valve path 33 is opened/closed by a valve seat 40 mounted on a plunger 39. The valve seat 40 is normally seated on a valve hole 42 by a biasing force of a return spring 41 to close the valve hole 42. However, when a solenoid coil 43 is energized, the plunger 39 is moved to the right to separate the valve seat 40 from the valve hole 42. In this manner, the valve hole 42 is opened.

In the position control mode, the solenoid coil 38 is energized to open the valve hole 37 to supply a large amount of compressed air per unit time from the reserve tank 17 to the main air spring chambers 11a to 11d through the valve path 32. However, in the height control mode, the solenoid coil 43 is energized to open the valve hole 42 to supply a small amount of compressed air per unit time from the reserve tank 17 to the main air spring chambers 11a to 11d through the valve path 33.

Figure 3:
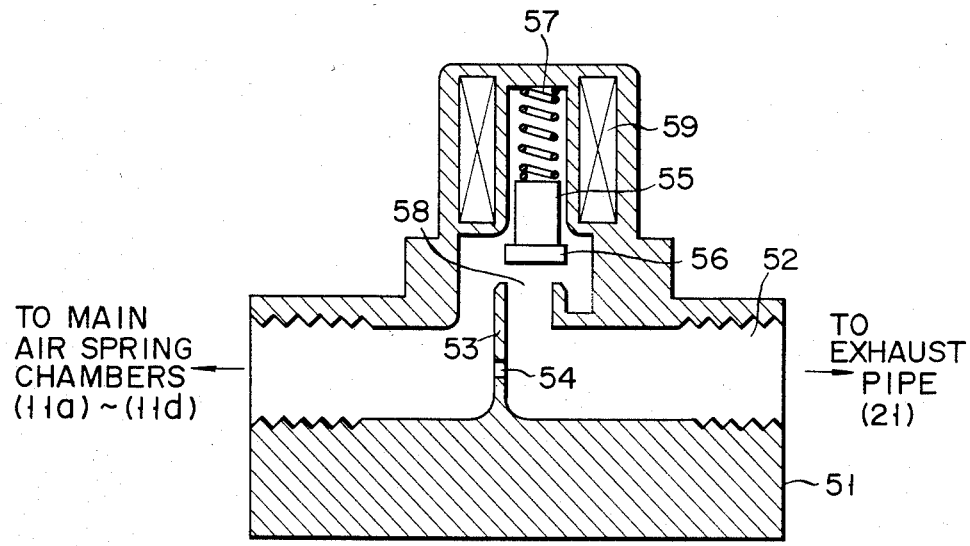
FIG. 3 is a sectional view of an exhaust flow rate control valve.

The construction of the exhaust flow rate control solenoid valve 20 will be described with reference to FIG. 3. Referring to FIG. 3, reference numeral 51 denotes a valve body. A valve path 52 is formed in the valve body 51. One end of the valve path 52 is coupled to the main air spring chambers 11a to 11d. The other end of the valve path 52 is coupled to the exhaust pipe 21. A partition wall 53 is formed integrally with the valve body 51 in the valve path 52. A small hole 54 is formed in the partition wall 53. The valve path 52 is opened/closed by a valve seat 56 mounted on a plunger 55. The valve seat 56 is normally biased by a spring 57 to separate from a valve hole 58 having a larger diameter than that of the small hole 54. In this manner, the valve hole 58 is normally opened. However, when a solenoid coil 59 is energized, the plunger 55 is moved downward to cause the valve seat 56 to sit on the valve hole 58. Therefore, the valve hole 58 is closed.

In the position control mode, the solenoid coil 38 is deenergized to open the valve hole 58, so that a large amount of compressed air per unit time from the main air-spring chambers 11a to 11d is exhausted to the exhaust pipe 21 through the valve hole 58 and the small hole 54. However, in the height control mode, the solenoid coil 59 is energized to close the valve hole 58, so that a small amount of compressed air per unit time from the main air-spring chambers 11a to 11d is exhausted to the exhaust pipe 21 through the small hole 54.

Figure 4A:
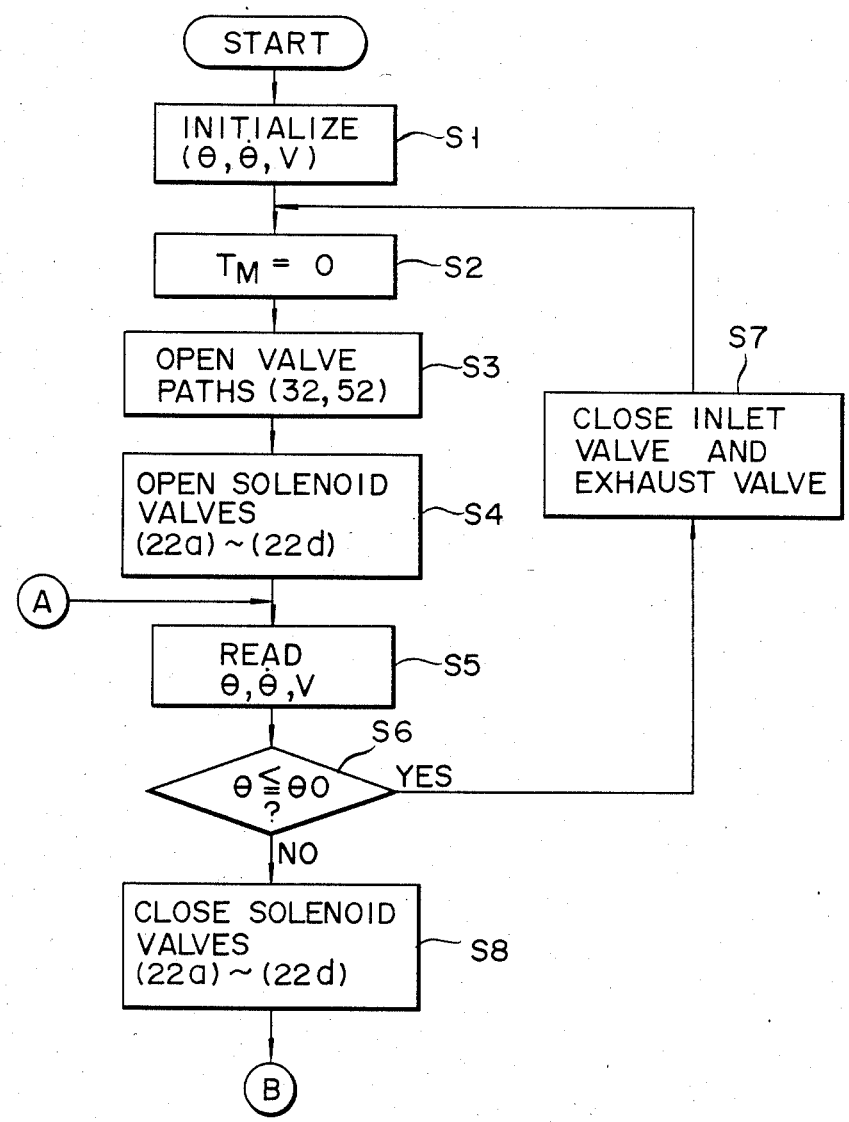
FIGS. 4A and 4B are flow charts for explaining the operation of the suspension apparatus shown in FIG. 1.
Figure 4B:
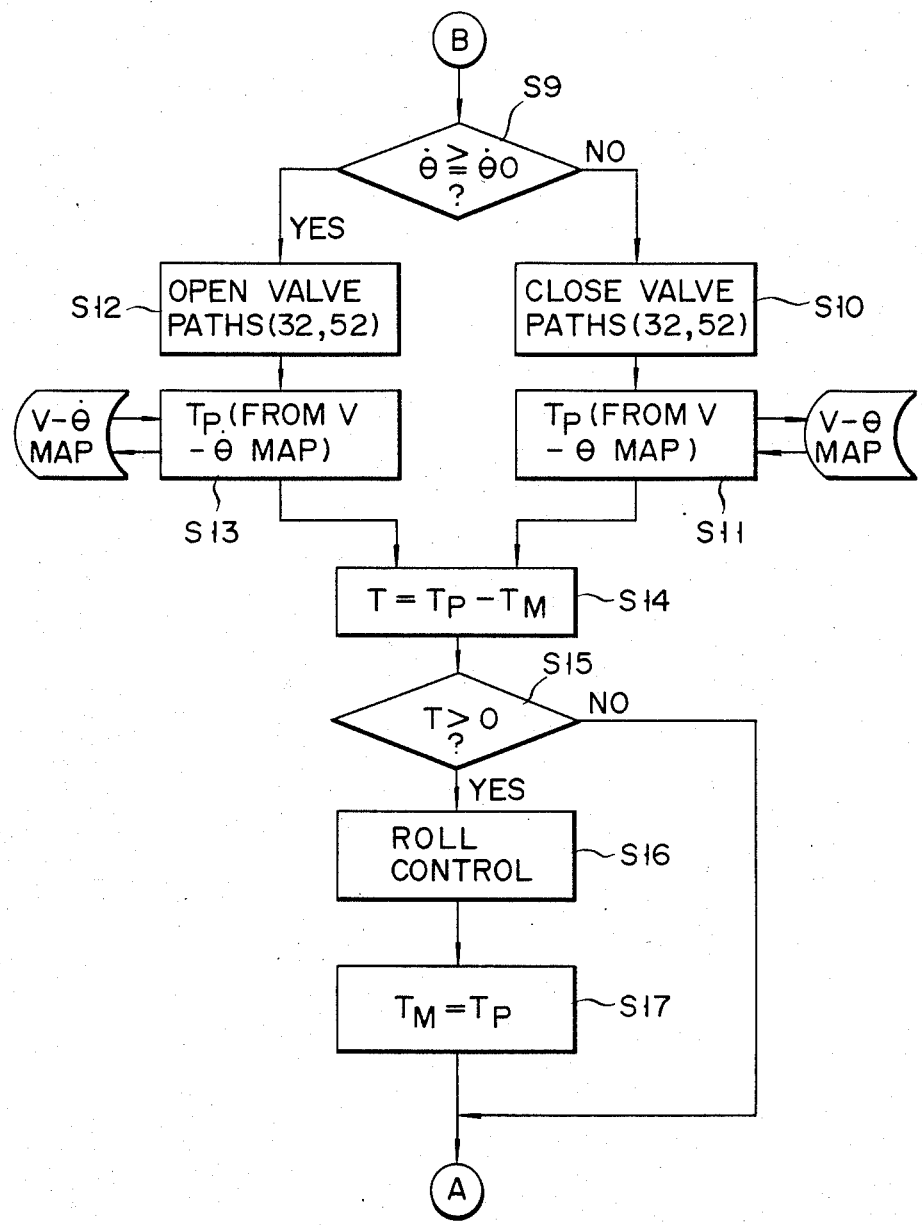

The operation of the suspension apparatus having the construction described above will be described with reference to FIGS. 4A and 4B. When a driver turns an ignition key, the controller 23 performs the operation, as shown in the flow charts of FIGS. 4A and 4B. In step S1, a steering angle $\theta$, a steering angular velocity $\dot{\theta}$, and a velocity V are cleared from a predetermined memory area in the controller 23. In step S2, a map memory $T_M$ is reset ($T_M=0$). In step S3, the controller 23 checks that the valve path 32 having a larger diameter than that of the valve path 33 for the solenoid valves 18a to 18d is opened, and that the larger valve hole 58 of the solenoid valve 20 is opened. In this case, if the valve path 32 and the valve hole 58 are not open, they are opened under the control of the controller 23. The controller 23 checks in step S4 that the communicating solenoid valves 22a to 22d are opened. In this case, if the valves 22a to 22d are not open, they are opened under the control of the controller 23. In step S5, the steering angle $\theta$ detected by the steering sensor 24 is supplied to the controller 23. At the same time, a change in the steering angle as a function of time, i.e., the steering angular velocity $\dot{\theta}$, is calculated by the controller 23. Furthermore, the velocity data detected by the velocity sensor 25 is supplied to the controller 23. The controller 23 checks in step S6 whether or not the steering angle corresponds to a neutral position of the steering wheel, i.e., $\theta \leq \theta_0$. Here, the neutral position indicates that the steering wheel is not turned clockwise or counterclockwise at an angle exceeding a predetermined angle. If YES in step S6, the flow advances to step S7. In step 7, the controller 23 checks that the solenoid valves 18a to 18d and 19a to 19d are closed. If not, they are closed under the control of the controller 23.

Figure 5:
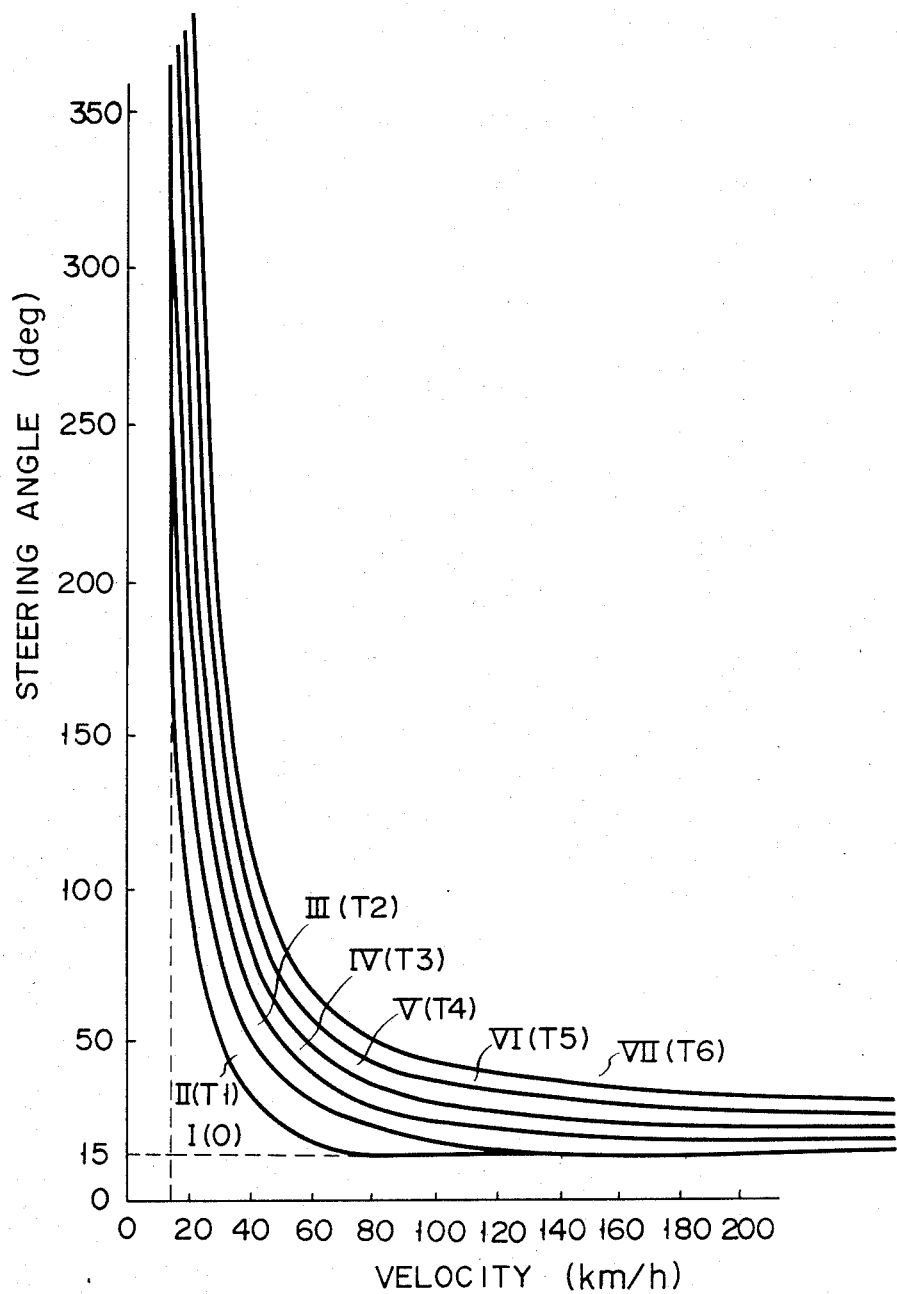
FIG. 5 is a graph for explaining the steering angle as a function of the velocity of the vehicle.

However, if NO is determined in step S6, the roll control operation after step S8 is performed. In step S8, the controller 23 closes the communicating solenoid valves 22a to 22d. The controller 23 checks in step 9 whether or not the current steering angular velocity $\dot{\theta}$ exceeds the predetermined value $\dot{\theta}_0$. If NO is determined in step S9, the flow advances to step S10. In step S10, the controller 23 checks that the valve path 32 for the solenoid valves 18a to 18d, and the larger valve hole 58 for the solenoid valve 20 are closed. If not, they are closed under the control of the controller 23. In step S11, the controller 23 calculates a control time $T_P$ (i.e., a time for opening the solenoid valve), in accordance with the graph shown in FIG. 5, by using the steering angle and the velocity. The control time $T_P$ is determined by regions I to VII of the graph of FIG. 5 and is represented in parentheses.

Figure 6:
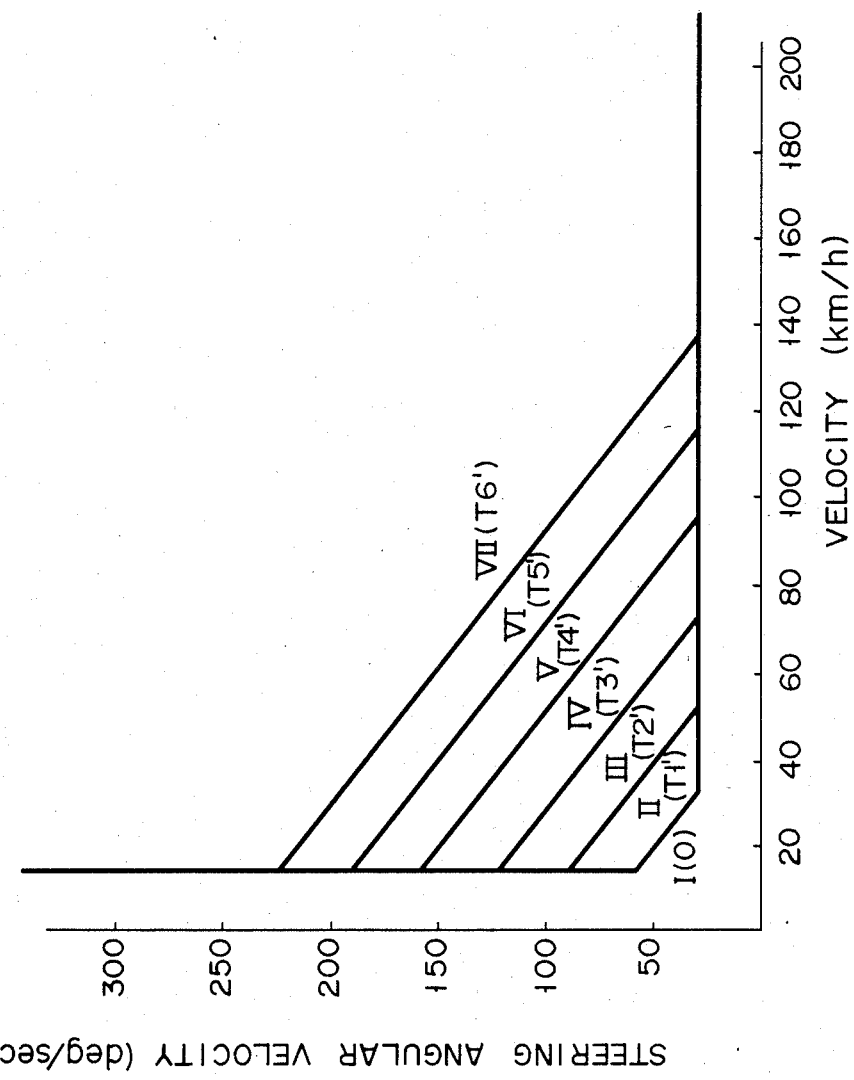
FIG. 6 is a graph for explaining the steering angular velocity as a function of the velocity.

However, if YES is determined in step 9, the flow advances to step S12. The controller 23 checks that the valve path 32 and the valve hole 58 are opened. If not, they are opened under the control of the controller 23. In step S13, the controller 23 calculates a control time $T_P$ (i.e., a time for opening the solenoid valve), in accordance with the graph shown in FIG. 6, by using the steering angular velocity $\dot{\theta}$ and the velocity V. The control time $T_P$ is determined by regions I to VII of the graph of FIG. 6 and is represented in parentheses. When the operation in steps S10 and S11 or steps S12 and S13 is completed, the controller 23 calculates a control time $T(=T_P-T_M)$ in step S14. The controller 23 then checks in step S15 whether or not condition $T>0$ is established. If NO in step S15, the flow returns to step 5. In this case, vehicle position control is not performed. However, if YES in step S15, the flow advances to step S16. The ON/OFF operation of the solenoid valves 18a to 18b and 19a to 19d is controlled in accordance with the control time T in step S16, thereby performing vehicle position control. For example, when the driver turns the steering wheel clockwise, the left wheel solenoid valves 18b and 18d are opened for the control time T to supply compressed air to the main air spring chambers 11b and 11d under the control of the controller 23. Therefore, the shock absorbers at the left wheels are biased to increase the vehicle height. Furthermore, the right wheel solenoid valves 19a and 19c are opened for the control time T to exhaust the compressed air from the main air spring chambers 11a and 11c under the control of the controller 23. As a result, the shock absorbers at the right wheels are biased to decrease the vehicle height. In other words, when the driver turns the steering wheel clockwise, the decrease in the left vehicle height and the increase in the right vehicle height are reduced to prevent the vehicle from rolling.

In this case, the controller 23 controls the flow rate of the compressed air through the solenoid valves 18b and 18d and solenoid valve 20 per unit time depending on judgement of step S9 to slowly perform position control by using a small amount of compressed air per unit time when the vehicle is normally turned. However, when the vehicle is quickly turned, the flow rate of the compressed air through the solenoid valves 18b and 18d and solenoid valve 20 per unit time is increased, thereby performing quick position control.

When the operation in step S16 is completed, the flow advances to step S17 wherein the map memory is updated. In other words, let $T_M$ be $T_P$. In this case, the flow returns to step S5 again. When turning is continuously performed in the same regions in the graphs of FIGS. 5 and 6, or in the regions providing short control times, the control time $T_P$ calculated in step S11 or S13 is equal to or shorter than the stored control time in the map memory. In step S15, condition $T \leq 0$ is established, so that the flow returns from step S15 to step S5.

When straight travel is started afer turning is completed, step S6 is determined to be YES. The controller checks in step S7 that the solenoid valves 18a to 18d and 19a to 19d are closed. The solenoid valves 22a to 22d are opened in step S4 through steps S2 and S3. Therefore, the right and left spring chambers are kept at the same pressure.

When the region in the graph changes to a region for a long control time, since the control time $T_P$ calculated in step S11 or S13 is longer than that stored in the map memory, the necessary control time $T(=T_P-T_M)$ is calculated in step S14. In step S16, the control is performed in accordance with the calculated control time T.

According to this embodiment of the present invention, normal turning or quick turning is detected in accordance with a determination whether the steering angular velocity exceeds the reference value. When normal turning, which results in slow roll displacement, is performed, the amount of compressed air per unit time is decreased, and the corresponding control time T is obtained with reference to the graphs in FIGS. 5 and 6, thereby performing relatively moderate control. However, when rapid turning, which results in abrupt roll displacement, is performed, the amount of compressed air per unit time is increased, and the corresponding control time T is obtained with reference to the graphs. Optimal vehicle position control can be performed irrespective of normal or rapid turning. Therefore, rolling of the vehicle can be prevented to improve driving stability.

Figure 7:
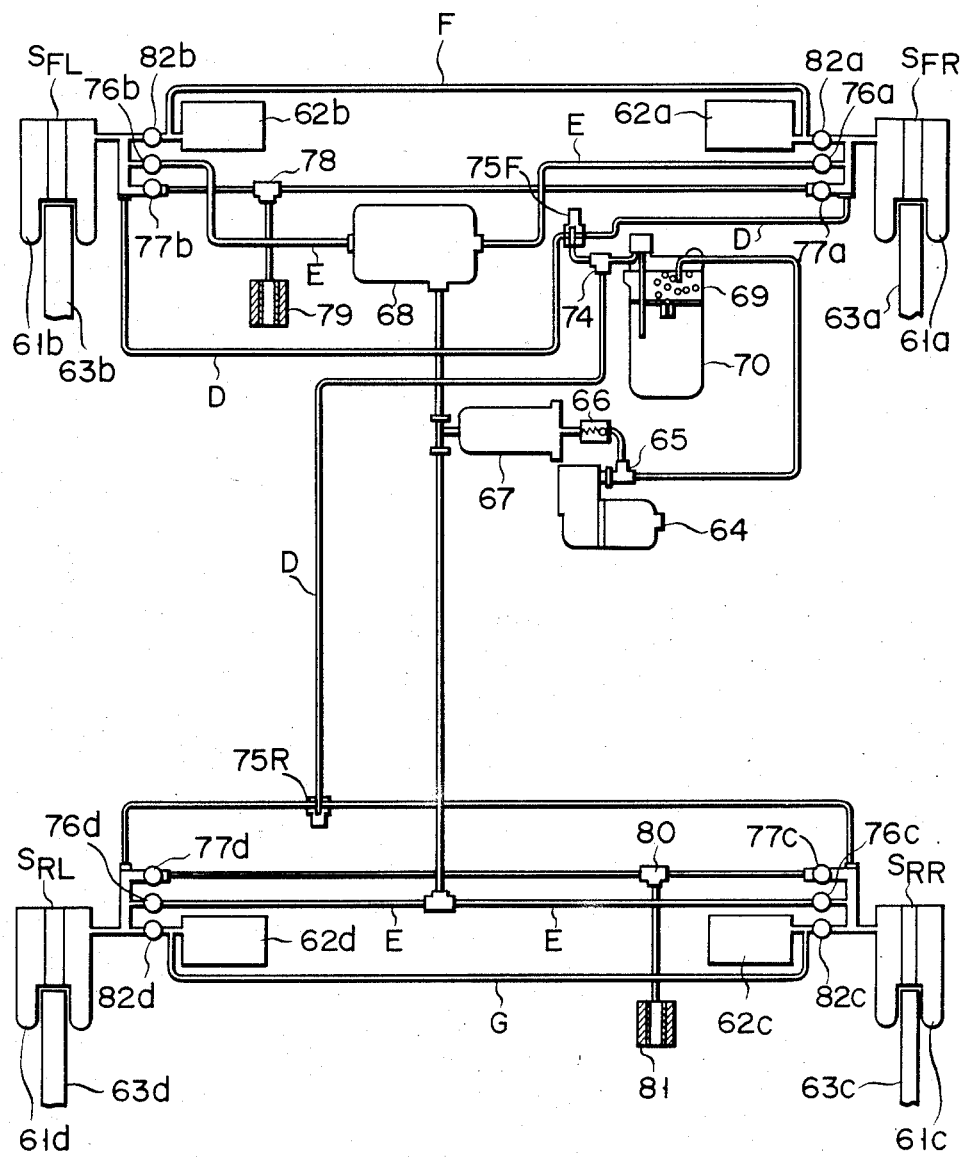
FIG. 7 is a diagram showing a vehicle suspension apparatus according to another embodiment of the present invention.

A vehicle suspension apparatus according to another embodiment will be described hereinafter. Referring to FIG. 7, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ respectively comprise main air-spring chambers 61a to 61d, sub air spring chambers 62a to 62d, shock absorbers 63a to 63d, and coil springs (not shown) serving as auxiliary springs. Reference numeral 64 denotes a compressor. The compressor 64 compresses air supplied from an air cleaner (not shown) and supplies compressed air to a reserve tank 68 through a joint 65, a check valve 66 and a drier 67. In addition, the compressor 64 compresses air supplied from an air cleaner (not shown) and supplies compressed air to a height control reserve tank 70 through the joint 65 and a drier 69.

The compressed air stored in the reserve tank 70 is supplied to the main air spring chambers 61a and 61b through a joint 74, a front vehicle height control solenoid valve 75F and height control piping D. The compressed air from the reserve tank 70 is supplied to the main air spring chambers 61c and 61d through the joint 74, the height control piping D and a rear height control solenoid valve 75R.

The compressed air stored in the reserve tank 68 is supplied to the main air spring chamber 61a through a position control pipe E and an inlet solenoid valve 76a, to the main air spring chamber 61b through the position control pipe E and an inlet solenoid valve 76b, to the main air spring chamber 61c through the position control pipe E and an inlet solenoid valve 76c, and to the main air spring chamber 61d through the position control pipe E and an inlet solenoid valve 76d.

The compressed air in the main air spring chamber 61a is exhausted to the atmosphere through an exhaust solenoid valve 77a, a joint 78 and an exhaust pipe 79. Similarly, the compressed air in the main air spring chamber 61b is exhausted to the atmosphere through an exhaust solenoid valve 77b, the joint 78 and the exhaust pipe 79. The compressed air in the main air spring chamber 61c is exhausted to the atmosphere through an exhaust solenoid valve 77c, a joint 80 and an exhaust pipe 81. Similarly, the compressed air in the main air spring chamber 61d is exhausted to the atmosphere through an exhaust solenoid valve 77d, the joint 80 and the exhaust pipe 81.

The main air spring chambers 61a and 61b are coupled to each other through a communicating solenoid valve 82a, a communicating pipe F and a communicating solenoid valve 82b. The communicating solenoid valve 82a controls communication between the main air spring chamber 61a and the sub air spring chamber 62a. Similarly, the communicating solenoid valve 82b controls communication between the main air spring chamber 61b and the sub air spring chamber 62b. The main air spring chambers 61c and 61d are coupled through a communicating solenoid valve 82c, a communicating pipe G and a communicating solenoid valve 82d. The communicating solenoid valve 82c controls communication between the main air spring chamber 61c and the sub air spring chamber 62c. Similarly, the communicating solenoid valve 82d controls communication between the main spring chamber 61d and the sub air spring chamber 62d.

It should be noted that the solenoid valves 76a to 76d and 77a to 77d comprise normally closed valves, and that the solenoid valves 82a to 82d comprise normally opened valves.

The operation of the suspension apparatus having the construction described above will be described hereinafter. The operation is restricted to the prevention of rolling occurring when the vehicle turns right, and the left front and rear heights of the vehicle are lowered. The solenoid valve 82b is closed to disconnect the main air spring chamber 61b and the sub air spring chamber 62b, thereby increasing an air spring constant of the left front suspension unit $S_{FL}$. In this state, the main air spring chamber 61a is disconnected from the main air spring chamber 61b. Furthermore, the solenoid valve 82d is closed to disconnect the main air spring chamber 61d and the sub air spring chamber 62d, thereby increasing an air spring constant of the left rear suspension unit $S_{RL}$. The main air spring chamber 61c is disconnected from the main air spring chamber 61d.

The solenoid valves 76b and 76d are opened for a predetermined period of time to supply compressed air from the reserve tank 68 to the main air spring chambers 61b and 61d to increase the left front and rear heights.

The solenoid valve 82a is closed to disconnect the main air spring chamber 61a and the sub air spring chamber 62a, thereby increasing the air spring constant of the right front suspension unit $S_{FR}$. The main air spring chamber 61a is disconnected from the main air spring chamber 61b. In addition, the solenoid valve 82c is closed to disconnect the main air spring chamber 61c and the sub air spring chamber 62c, thereby increasing an air spring constant of the right rear suspension unit $S_{RR}$. The main air spring chamber 61c is disconnected from the main air spring chamber 61d. Subsequently, the solenoid valves 77a and 77c are opened for a predetermined period of time to exhaust the compressed air from the main air spring chambers 61a and 61c, thereby lowering the right front and rear heights. Therefore, rolling occurring in the right turn of the vehicle can be prevented. When the vehicle turns right, the solenoid valves 82a to 82d are opened to decrease the air spring constants of the suspension units $S_{FR}$, $S_{FL}$, $S_{RR}$ and $S_{RL}$. At the same time, the front air spring chambers 61a and 61b communicate with each other, and the rear air spring chambers 61c and 61d communicate with each other.

In normal height control, the solenoid valves 75F and 75R are opened/closed to supply the compressed air from the reserve tank 70 to the main air spring chambers 61a to 61d or to exhaust the compressed air from the main air spring chambers 61a to 61d through the solenoid valves 77a to 77d and the exhaust pipe 79 or 81.

In the height control mode, the compressed air in the reserve tank 70 is supplied to the main air spring chambers 61a to 61d through the piping D having a smaller diameter than that of the pipe E. Therefore, the amount of compressed air per unit time in the height control mode is smaller than that in the position control mode, and overshooting of the height in the height control mode can be prevented and passenger discomfort can be reduced.

When the main air spring chamber 61c is disconnected from the chamber 61d, the air spring constants of the suspension units $S_{FR}$, $S_{FL}$, $S_{RR}$ and $S_{RL}$ can be increased. Valves need not be arranged in the communication paths F and G, so the number of valves can be decreased, thus decreasing the installation space and providing an economical advantage.

In the above two embodiments, the fluid is air. However, the fluid is not limited to air, but can be any safe and controllable medium.

Furthermore, the present invention is not limited to a suspension apparatus using an air spring, but can be extended to a hydropneumatic type suspension apparatus using a liquid and a gas.

According to the second embodiment of the present invention, the reserve tank for storing compressed air and the air spring chambers of the respective suspension units are coupled through a vehicle position control pipe and a height control pipe having a smaller diameter than that of the vehicle position control pipe. In the vehicle position control mode, the compressed air is supplied to the air spring chambers through the position control pipe. In the height control mode, the compressed air is supplied to the air spring chambers through the height control pipe. Therefore, height overshooting can be reduced. In addition, the number of valves is decreased to provide a compact and low-cost vehicle suspension apparatus.

What is claimed is:

1. A suspension apparatus comprising: suspension units mounted on respective wheels, each unit having a fluid spring chamber; fluid supply means having fluid supply path selecting means for selecting one of large- and small-diameter fluid supply paths and supplying the fluid to said fluid spring chambers through a selected one of said large- and small-diameter fluid supply paths; and fluid exhaust means having fluid exhaust path selecting means for selecting one of large- and small-diameter fluid exhaust paths and exhausting the fluid from said fluid spring chambers through a selected one of said large- and small-diameter fluid exhaust paths, so that the fluid is supplied to said fluid spring chambers of contracted said suspension units, and the fluid is exhausted from said fluid spring chambers of elongated said suspension units when a vehicle changes a position thereof so as to control a change in the position of the vehicle.

2. An apparatus according to claim 1, wherein said fluid supply means and said fluid exhaust means select the large-diameter path in a position control mode and the small-diameter path in a height control mode.

3. An apparatus according to claim 1, wherein each of said fluid supply path selecting means and the fluid exhaust path selecting means comprises a valve for selecting one of said large- and small-diameter paths formed therein.

4. An apparatus according to claim 1, wherein said fluid supply means comprises a position control large-diameter pipe and a height control small-diameter pipe which are coupled parallel to each other between a fluid source for storing the fluid and said fluid spring chambers.

5. An apparatus according to claim 1, wherein said fluid path selecting means selects said large-diameter path when the position control quantity is large, and selects said small-diameter path when the position control quantity is small.

6. A suspension apparatus comprising: suspension units mounted on respective wheels, each unit having a fluid spring chamber; fluid supply means having fluid supply path selecting means for selecting one of large-and small-diameter fluid supply paths and supplying the fluid to said fluid spring chambers through a selected one of said large- and small-diameter fluid supply paths; fluid exhaust means having fluid exhaust path selecting means for selecting one of large- and small-diameter fluid exhaust paths and exhausting the fluid from said fluid spring chambers through a selected one of said large- and small-diameter fluid exhaust paths; and a communication path for communicating right and left corresponding ones of said fluid spring chambers through a front communicating control valve and, a rear communicating control valve, respectively, so that the fluid is supplied to said fluid spring chambers of contracted said suspension units, and the fluid is exhausted from said fluid spring chambers of elongated said suspension units when a vehicle changes a position thereof so as to control a change in the position of the vehicle, said communication path being closed when the apparatus is set to the position control mode, and being open when the apparatus is set to the height control mode.

7. An apparatus according to claim 6, which further comprises spring-constant-adjusting sub fluid spring chambers, arranged to correspond to said fluid spring chambers, respectively, and spring-constant-adjusting valves arranged between said fluid spring chambers and said sub fluid spring chambers, respectively.

8. An apparatus according to claim 7, wherein said spring-constant-adjusting valves also serve as said communicating control valves.

9. A suspension apparatus comprising: hydropneumatic suspension units mounted on respective wheels and having fluid spring chambers, respectively; fluid supply means having fluid supply path selecting means for selecting one of large- and small-diameter fluid supply paths and supplying the fluid to said fluid spring chambers through a selected one of said large-and small-diameter fluid supply paths; and fluid exhaust means having fluid exhaust path selecting means for selecting one of large- and small-diameter fluid exhaust paths and exhausting the fluid from said fluid spring chambers through a selected one of said large- and small-diameter fluid exhaust paths, so that the fluid is supplied to said fluid spring chambers of contracted said hydropneumatic suspension units, and the fluid is exhausted from said fluid spring chambers of elongated said hydropneumatic suspension units when a vehicle changes a position thereof so as to control a change in the position of the vehicle.

10. A suspension apparatus comprising: suspension units mounted on respective wheels, each unit having an air spring chamber; air supply means having air supply path selecting means for selecting one of large- and small-diameter air supply paths and supplying the air to said air spring chambers through a selected one of said large- and small-diameter air supply paths; and air exhaust means having air exhaust path selecting means for selecting one of large- and small-diameter air exhaust paths and exhausting the air from said air spring chambers through a selected one of said large-and small-diameter air exhaust paths, so that the air is supplied to said air spring chambers of contracted said suspension units, and the air is exhausted from said air spring chambers of elongated said suspension units when a vehicle changes a position thereof so as to control a change in the position of the vehicle.

* * * * *